(12) United States Patent
Barnes et al.

(10) Patent No.: US 10,348,889 B2
(45) Date of Patent: Jul. 9, 2019

(54) SYSTEM AND METHOD OF PROVIDING CALLER IDENTIFICATION INFORMATION

(71) Applicant: AT&T INTELLECTUAL PROPERTY I, L.P., Atlanta, GA (US)

(72) Inventors: Bruce Ronald Barnes, Pingree Grove, IL (US); Mark Gribble, Sycamore, IL (US); Shadi Khoshaba, Skokie, IL (US); Wayne Heinmiller, Elgin, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 298 days.

(21) Appl. No.: 14/479,016

(22) Filed: Sep. 5, 2014

(65) Prior Publication Data

US 2014/0378107 A1    Dec. 25, 2014

Related U.S. Application Data

(63) Continuation of application No. 11/788,037, filed on Apr. 18, 2007, now Pat. No. 8,855,274.

(51) Int. Cl.
| | |
|---|---|
| *H04M 11/00* | (2006.01) |
| *H04M 3/42* | (2006.01) |
| *H04M 1/57* | (2006.01) |
| *H04M 1/725* | (2006.01) |
| *H04W 4/16* | (2009.01) |

(52) U.S. Cl.
CPC ....... *H04M 3/42042* (2013.01); *H04M 1/576* (2013.01); *H04M 1/7253* (2013.01); *H04W 4/16* (2013.01); *H04M 2250/02* (2013.01); *H04M 2250/60* (2013.01)

(58) Field of Classification Search
CPC ............. H04M 3/53325; H04M 3/493; H04M 3/42042; H04M 1/576; H04M 1/7253
USPC ...................................................... 379/88.13
See application file for complete search history.

(56) References Cited

U.S. PATENT DOCUMENTS

| | | | |
|---|---|---|---|
| 7,263,178 B1 * | 8/2007 | Brothers | H04M 1/6505 379/142.01 |
| 8,015,119 B2 * | 9/2011 | Buyukkokten | G06Q 30/02 705/319 |
| 2002/0067816 A1 * | 6/2002 | Bushnell | H04M 3/42042 379/201.02 |
| 2003/0152055 A1 | 8/2003 | Aragones et al. | |
| 2003/0198329 A1 * | 10/2003 | McGee | H04M 1/575 379/202.01 |

(Continued)

OTHER PUBLICATIONS

"Micro DVR With Mini LCD Screen and Motion Detection Video Recording", Brickhouse Security, http://www.brickhousesecurity.com/microdvrstarnexselfguard.html, retrieved Mar. 22, 2007, 2 pages.

(Continued)

*Primary Examiner* — Simon King
(74) *Attorney, Agent, or Firm* — Toler Law Group, PC (57) ABSTRACT

A method may include receiving call information associated with an incoming communication directed to a destination communication device. The method may also include retrieving data related to the call information to be displayed according to a particular display profile of a plurality of display profiles, where the particular display profile is associated with the destination communication device.

20 Claims, 7 Drawing Sheets

(56) References Cited

U.S. PATENT DOCUMENTS

| | | |
|---|---|---|
| 2004/0032484 A1 | 2/2004 | Halttunen |
| 2004/0203374 A1 | 10/2004 | Zilliacus |
| 2004/0203835 A1* | 10/2004 | Trottier ................ H04M 1/576 455/454 |
| 2004/0209604 A1* | 10/2004 | Urban .................. H04M 1/575 455/415 |
| 2004/0209605 A1* | 10/2004 | Urban .................... H04W 4/20 455/415 |
| 2004/0264662 A1* | 12/2004 | Silver ..................... H04M 1/57 379/142.06 |
| 2005/0143103 A1 | 6/2005 | Bjorgan et al. |
| 2005/0232186 A1* | 10/2005 | Karaoguz ......... H04L 29/06027 370/328 |
| 2005/0277431 A1 | 12/2005 | White |
| 2006/0007899 A1 | 1/2006 | White |
| 2006/0040638 A1 | 2/2006 | McQuaide, Jr. et al. |
| 2006/0075108 A1 | 4/2006 | Sylvain |
| 2006/0085832 A1 | 4/2006 | Groff et al. |
| 2006/0291506 A1 | 12/2006 | Cain |
| 2007/0047519 A1* | 3/2007 | Bangor ............. H04L 29/06027 370/352 |
| 2007/0245384 A1 | 10/2007 | Walter et al. |
| 2008/0125098 A1 | 5/2008 | Bruce et al. |
| 2008/0137828 A1 | 6/2008 | Chmaytelli |
| 2008/0152110 A1 | 6/2008 | Underwood et al. |
| 2008/0240702 A1* | 10/2008 | Wassingbo ........... G11B 27/105 396/310 |

OTHER PUBLICATIONS

"New Dish Network ViP622 DVR Next Generation MPEG4 HD Receiver with 2 Tuners for 2 TVs", http://www.sadoun.com/Sat/Products/Dishnetwork/Receivers/Dish-ViP622-DVR-HDTV-Satellite-receiver.htm, Sadoun Satellite Sales, retrieved on Mar. 22, 2007, 5 pages.

"TV Messenger—TV Set Call Display Unit—Owner's Guide", Smarthome.com, Inc., http://smarthome.com, Printed in Canada, downloaded on Mar. 22, 2007, pp. 1-24.

Wilson, Mark, "TV Messenger—Caller ID on TV", http://gizmodo.com/gadgets/gadgets/tv-messenger--caller-id-on-tv-206054.php, Oct. 8, 2006, 5 pages.

Zhang, Tong, "Bluetake i-Phono BT420EX Bluetooth Stereo Headset", Mobile Tech Review, http://www.mobiletechreview.com/tips/Bluetake_i_Phono.html, Feb. 2005, 4 pages.

* cited by examiner

SYSTEM AND METHOD OF PROVIDING CALLER IDENTIFICATION INFORMATION

CLAIM OF PRIORITY

The present application is a continuation of and claims priority from U.S. patent application Ser. No. 14/788,037, filed on Apr. 18, 2007 and entitled "SYSTEM AND METHOD OF PROVIDING CALLER IDENTIFICATION INFORMATION," now U.S. Pat. No. 8,855,274, the contents of which are expressly incorporated herein by reference in its entirety.

FIELD OF THE DISCLOSURE

The present disclosure is generally related to providing caller identification information.

BACKGROUND

With the increased usage of mobile communication devices, such as mobile telephones, it has become more common for a household to have multiple communication devices. When an incoming communication is received at a particular one of the communication devices in a household, it may be inconvenient and time consuming to find the particular communication device that is receiving the communication. As a result, a user may not be able to readily identify who is calling. Hence, there is a need for an improved system and method for providing caller identification information.

DETAILED DESCRIPTION OF THE DRAWINGS

In a particular embodiment, a system to provide caller identification information is disclosed that includes a wireless communication module to receive caller identification information related to incoming communications to be received at a communication device. The system also includes a memory comprising a plurality of display profiles and settings associating the communication device with at least a particular display profile of the plurality of display profiles. The system also includes an output to display at a display device, data related to the caller identification information according to the particular display profile associated with the communication device.

In another particular embodiment, a method of presenting caller identification information is disclosed and includes receiving caller identification information associated with a first communication device at a video processing device via a wireless communication. The method also includes selecting a first display profile associated with the first communication device from among a plurality of display profiles. The method also includes generating a display in accordance with the first display profile. The display includes data related to the caller identification information.

In another particular embodiment, a processor-readable medium is disclosed that includes processor-readable instructions executable by a processor to select a first display profile associated with a first communication device associated with among a plurality of display profiles when caller identification information is received from the first communication device. The processor-readable instructions are also executable to generate a display in accordance with the first display profile. The display includes data related to the caller identification information.

Figure 1:
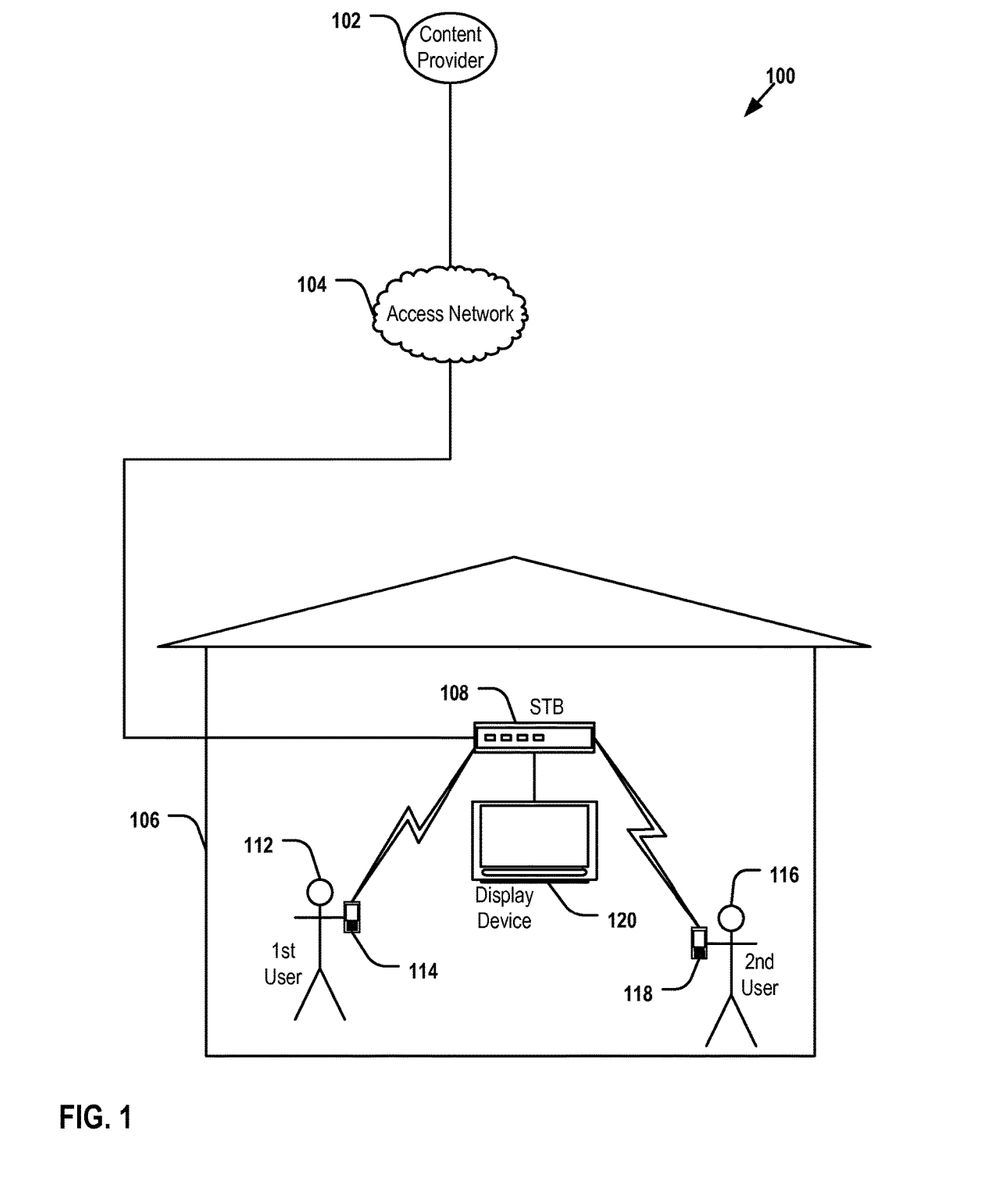
FIG. 1 is a block diagram of a first particular embodiment of a system to provide caller identification information.

FIG. 1 depicts a first particular embodiment of a system to provide caller identification information, generally designated 100. The system 100 includes a content provider 102 transmitting video content via an access network 104 to one or more user residences, such as residence 106. The system 100 also includes a video processing device 108 adapted to receive the video content and present a display including the video content at a display device 120. In an illustrative embodiment, the video processing device 108 may include a set-top box device, such as an Internet Protocol Television (IPTV) set-top box; a video recorder device, such as a digital video recorder (DVR); a cable box; a video gaming device or console; a personal computer or other computing device; any other device adapted to receive and process video content from a network; or any combination thereof.

In a particular embodiment, the video processing device 108 may also be adapted to receive caller identification information from a communication device, such as a first communication device 114 or a second communication device 118. The video processing device 108 may receive caller identification information via a wireless communication protocol, such as Bluetooth, 802.11x, Wi-Fi, ultrawideband (UWB), Wimax, any other wireless local area network protocol or wireless communications protocol, or any combination thereof. The video processing device 108 may also be adapted to include data related to the caller identification information in the display presented at the display device 120. The data associated with the caller identification information may include a telephone number associated with a calling party; a name of the calling party; a graphic associated with the calling party, such as a symbol or photograph; any other information indicating an identification of the calling party; or any combination thereof.

In a particular embodiment, data related to the caller identification information may be displayed according to a display profile associated with a communication device. For example, the video processing device 108 may store a first display profile associated with the first communication device 114. The first display profile may include information that the video processing device 108 may use to generate a distinctive display at the display device 120. The distinctive display may provide visual information indicating to an observer which communication device has received or is receiving a communication associated with the caller identification information. For example, when an incoming communication is received at the first communication device 114, the first communication device 114 may send caller identification information related to the incoming communication to the video processing device 108. The video processing device 108 may generate a distinctive display at the display device 120 based on a display profile associated with the first communication device 114. The distinctive display may include a color pattern (or color code) associated with the first communication device 114; a name associated with the first communication device 114; a name of a first user 112 associated with the first communication device 114; a graphic associated with the first communication device 114, such as a photograph or symbol associated with first user 112 or the first communication device 114; a location in which the data related to the caller identification information is displayed; any other display pattern; or any combination thereof.

In another example, the video processing device 108 may include a second display profile associated with the second communication device 118. The second display profile may include information to generate a distinctive display to present caller identification information received from the second communication device 118. In a particular illustrative embodiment, the display profiles may be user-configurable. That is, a user, such as the first user 112 or the second user 116, may interact with the video processing device 108 to specify a display profile associated with a particular communication device, such as the first communication device 114 or the second communication device 118.

In a particular embodiment, the video processing device 108 may process video content received from the content provider 102 and provide a display at the display device 120 including the video content. In an illustrative embodiment, the caller identification information may be presented overlaying the video content at the display device 120. The video processing device 108 may also process audio data received from the content provider 102 and may transmit the audio content via a wireless communication protocol to an audio device. In an illustrative embodiment, the video processing device 108 may transmit the audio data via wireless communication to an audio device. In a particular illustrative embodiment, the audio device may include headphones or an earpiece associated with one or more of the communication devices 114, 118, such as a Bluetooth earpiece.

Figure 2:
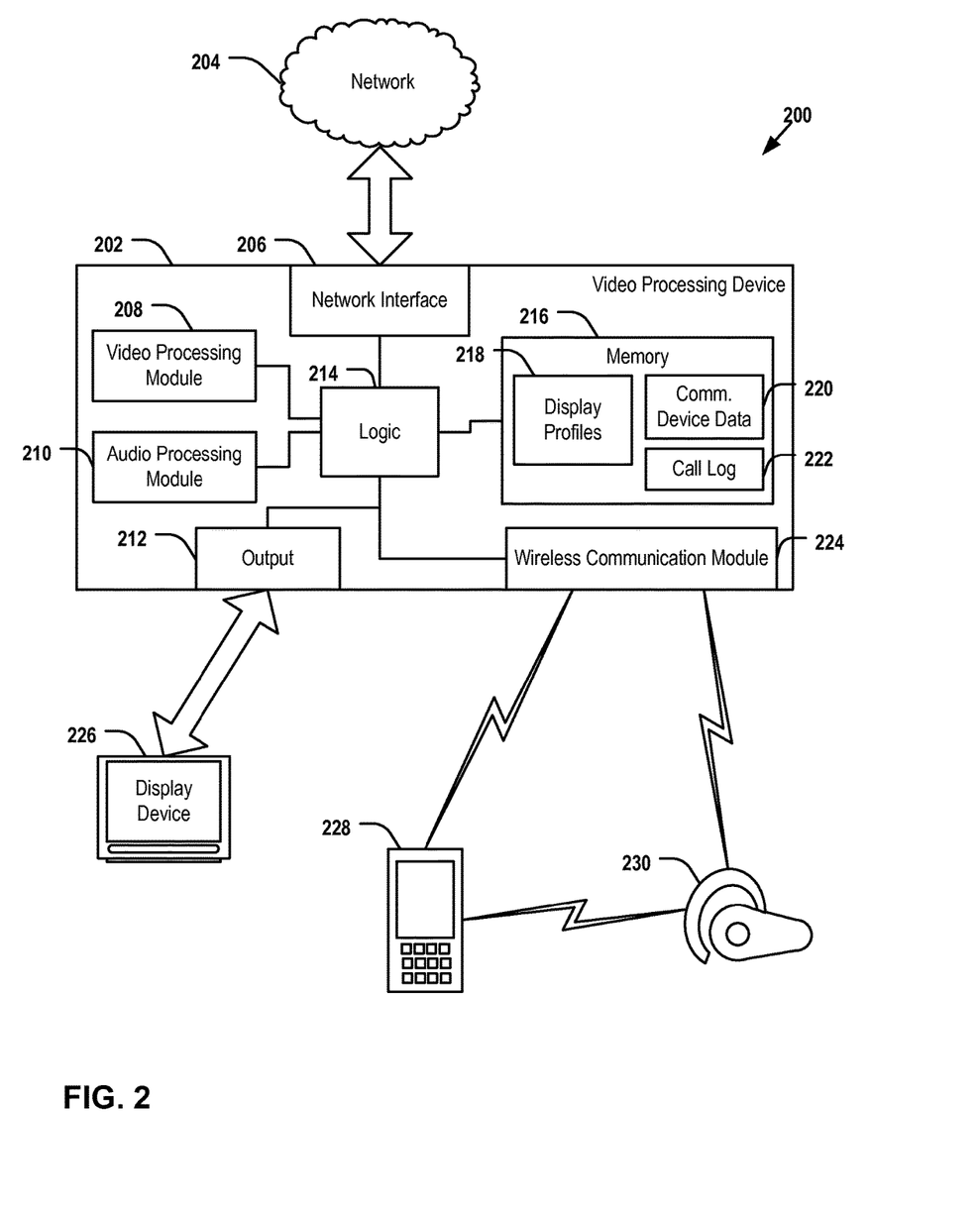
FIG. 2 is a block diagram of a second particular embodiment of a system to provide caller identification information.

FIG. 2 depicts a second particular embodiment of a system to provide caller identification information, generally designated 200. The system 200 includes a video processing device 202 communicating with a network 204 via a network interface 206. In an illustrative embodiment, the video processing device 202 may receive video content via the network 204 and may generate a display that includes the video content at a display device 226. In a particular embodiment, the video processing device 202 may include a video processing module 208 to process video content received via the network 204 and to provide the video content to the display device 226 via an output 212. The video processing module 208 may receive a data stream including video content and may decode or otherwise process the data stream to generate the display at the display device 226. In a particular embodiment, the video processing module 208 may be implemented using hardware, software instructions executable by the logic 214, or any combination thereof.

In a particular embodiment, the video processing device 202 may also include a wireless communication module 224. The wireless communication module 224 may be adapted to communicate with one or more communication devices, such as the communication device 228. In an illustrative embodiment, the wireless communication module 224 may communicate with the communication device 228 via a wireless communication protocol, such as Bluetooth, Wi-Fi, 802.11x, ultrawideband (UWB), Wimax, any other wireless local area network protocol or wireless communications protocol, or any combination thereof. In a particular embodiment, the wireless communication module 224 may be adapted to receive caller identification information from the communication device 228 when an incoming communication is received at the communication device 228 via a cellular network, for example. In an illustrative embodiment, the video processing device 202 may include data related to the caller identification information in the display presented at to the display device 226. In a particular embodiment, the wireless communication module 224 may be implemented using hardware, software instructions executable by the logic 214, or any combination thereof.

In a particular embodiment, the video processing device 202 may include a memory 216. The memory 216 may store data specifying a plurality of display profiles 218. The display profiles 218 may include information specifying distinctive manners of displaying data related to caller identification information at the display device 226 depending on which communication device has received or is receiving a call or other communication. One or more of the display profiles 218 may be associated with the communication device 228. For example, when caller identification information is received from the communication device 228 via the wireless communication module 224, the logic 214 may identify a display profile associated with the communication device 228 from the plurality of display profiles 218. The video processing module 208 may generate a display including data related to the caller identification information in accordance with the identified display profile.

In a particular embodiment, the memory 216 may include communication device data 220. The communication device data 220 may include information identifying a plurality of recognized communication devices. For example, the recognized communication devices may include one or more communication devices that have been registered with the video processing device 202. In a particular embodiment, the communication device data 220 may include information to identify a communication device from which caller identification information was received. For example, when the communication device 228 transmits caller identification information to the video processing device 202 using a wireless protocol, the wireless protocol may include identification information associated with the communication device 228. The identification information may include, for example, a media access control (MAC) address, an internet protocol (IP) address, any other identifiers associated with communication devices 228, or any combination thereof. In a particular embodiment, a communication from the communication device 228 to the video processing device 202 may include both the caller identification information and the identification of the communication device 228. Based on the identification of the communication device 228, the logic 214 may select a display profile associated with the communication device 228 to generate a display that identifies the communication device 228 and includes data related to the caller identification information. In a particular embodiment, the display profile associated with the communication device 228 may specify a color pattern; a graphic to display with the data related to the caller identification information; a name of a party associated with the communication device 228 to display with the caller identification information; any other information to identify the communication device 228 or a party associated with the communication device 228; or any combination thereof.

In a particular embodiment, the video processing device 202 may also include an audio processing module 210. The audio processing module 210 may process audio content associated with video content received via the network 204 and may send the audio content via the wireless communication module 224 to a remote audio device 230. For example, the wireless communication module 224 may send the audio content to the remote audio device 230 via a Bluetooth communication protocol. In a particular embodiment, the remote audio device 230 may include a wireless telephone headset adapted to conduct voice communications via the communication device 228. For example, the remote audio device 230 may include a Bluetooth ear piece associated with the communication device 228. In an illustrative embodiment, the audio module 210 may be implemented using hardware, software instructions executable by the logic 214, or any combination thereof.

Figure 6:
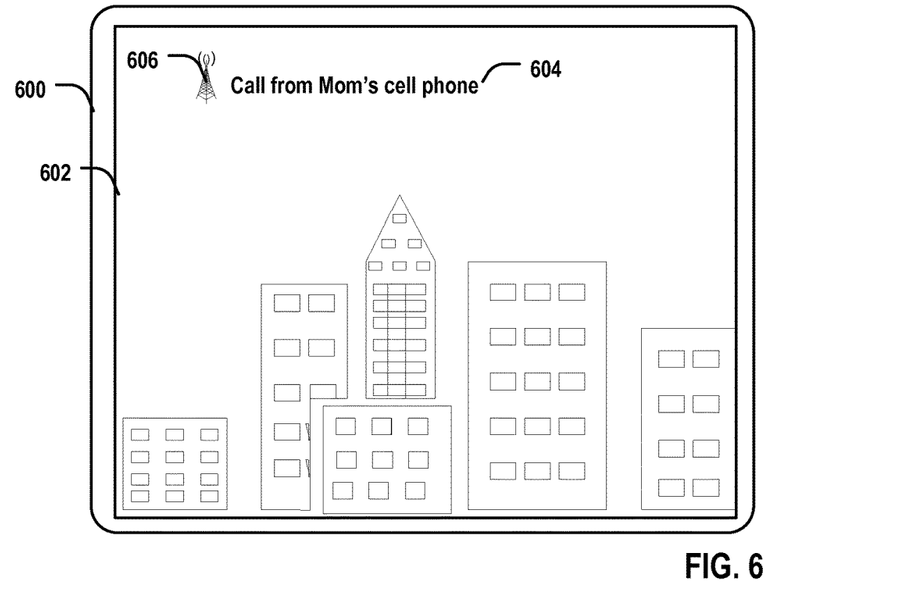
FIG. 6 is a diagram of a third particular embodiment of a user interface to present caller identification information.
Figure 7:
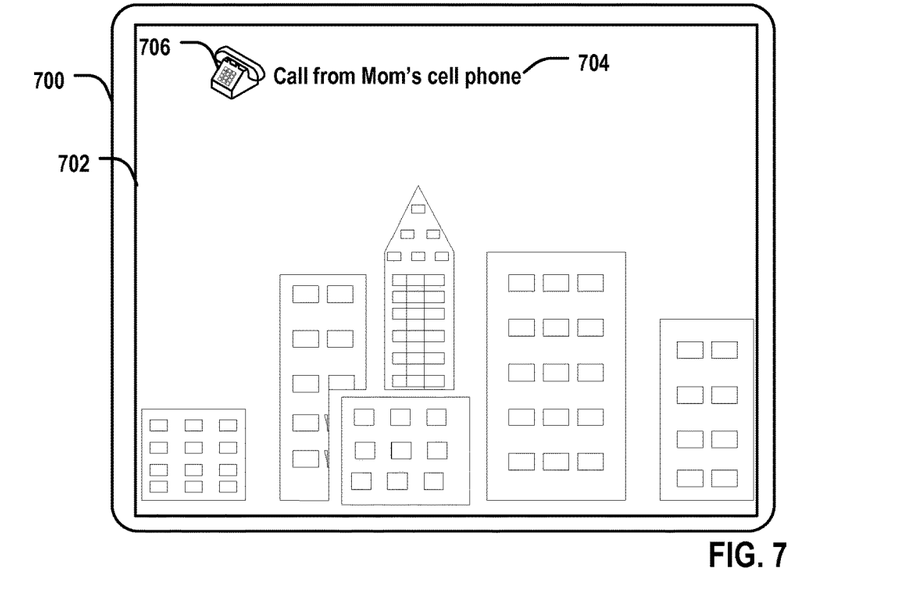
FIG. 7 is a diagram of a fourth particular embodiment of a user interface to present caller identification information.

In a particular embodiment, the video processing device 202 may be adapted to communicate with a plurality of communication devices. For example, the communication devices may include one or more landline telephone devices, one or more mobile telephone devices, one or more other wired or wireless communication devices, or any combination thereof. In an illustrative embodiment, the video processing device 202 may be adapted to communicate with a landline telephone and a mobile telephone. In this particular embodiment, a display profile may be associated with the landline telephone. The display profile may indicate that the communication device is a landline telephone. For example, the display profile may include a graphic representation of a landline telephone, as illustrated in FIG. 7. A display profile associated with the mobile telephone may indicate that the communication device is a mobile telephone. For example, the display profile may include a graphical representation indicating that the communication device is a mobile telephone, as illustrated in FIG. 6.

In a particular embodiment the memory 216 may also include a call log 222. The call log 222 may include a record of incoming communications associated with the communication device 228 or one or more other communication devices. For example, the call log 222 may include a record of recently received incoming communications received by the communication device 228.

Figure 3:
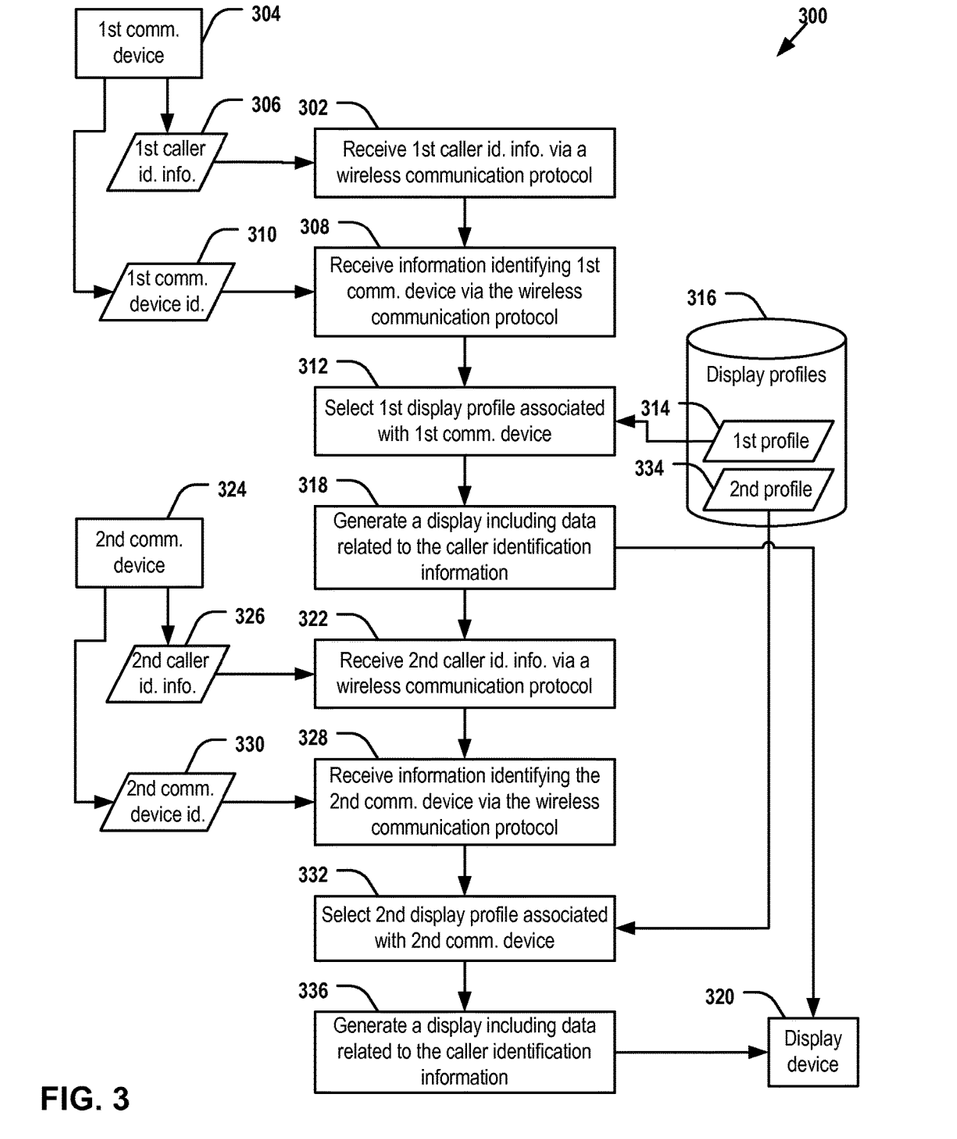
FIG. 3 is a flow diagram of a particular embodiment of a method of providing caller identification information.

FIG. 3 depicts a particular embodiment of a method of providing caller identification information, generally designated 300. The method 300 includes, at 302, receiving caller identification information 306 from a first communication device 304 at a video processing device via a wireless communication protocol. The method 300 also includes, at 308, receiving information identifying the first communication device 304 via the wireless communication protocol. For example, the information identifying the first communication device may include a first communication device identifier 310.

The method 300 also includes, at 312, selecting a first display profile 314 associated with the first communication device 304 from among a plurality of display profiles 316. The method 300 also includes, at 318, generating a display at a display device 320 in accordance with the first display profile 314. The display may include data related to the first caller identification information 306. For example, the display may include a telephone number of a calling party; text associated with the calling party, such as a name or title; a graphic associated with the calling party, such as a photograph or symbol; other data associated with the calling party; or any combination thereof.

In a particular embodiment, the method 300 may include, at 322, receiving second caller identification information 326 from a second communication device 324 at the video processing device via a wireless communication protocol. The method 300 may also include, at 328, receiving information identifying the second communication device 324 via the wireless communication protocol. For example, the information identifying the second communication device may include second communication device identification 330.

In a particular embodiment, the method 300 may include, at 332, selecting a second display profile 334 associated with the second communication device 324 from the plurality of display profiles 316. The method 300 may also include, at 336, generating a second display in accordance with the second display profile 334. The second display may include data related to the second caller identification information 326.

In a particular embodiment, the caller identification information 306, 326 may be received at a video processing device. The video processing device may be adapted to receive video content from a content source and to generate a display at the display device 320 that includes the video content. In a particular embodiment, the video processing device may include a set-top box device, such as an Internet Protocol Television (IPTV) set-top box; a video recorder device, such as a digital video recorder (DVR); a cable box; a video gaming device or console; a personal computer or other computing device; any other device adapted to receive and process video content; or any combination thereof. In a particular embodiment, the video processing device may be adapted to record video content received from the content source and to generate a display of the recorded video content at the display device 320. In such an embodiment, the video processing device may be adapted to not record the caller identification information 326 with the video content. That is, video content recorded by the video processing device when caller identification information is received may be played back later without the caller identification information being presented in the display.

In an illustrative embodiment, the first communication device 304 may include a landline telephone and the second communication device 324 may include a mobile telephone. In this embodiment, the first display profile 314 may include an indication that an incoming communication is directed to the landline telephone 304, and the second display profile 334 may include an indication that an incoming communication is directed to the mobile telephone 324. In another illustrative embodiment, the first communication device 304 may include a first mobile telephone and the second communication device 324 may include a second mobile telephone. In this embodiment, the first display profile 314 may specify an indication that an incoming communication is directed to the first mobile telephone 304, and the second display profile 334 may specify an indication that the incoming communication is directed to the second mobile telephone 324.

Figure 4:
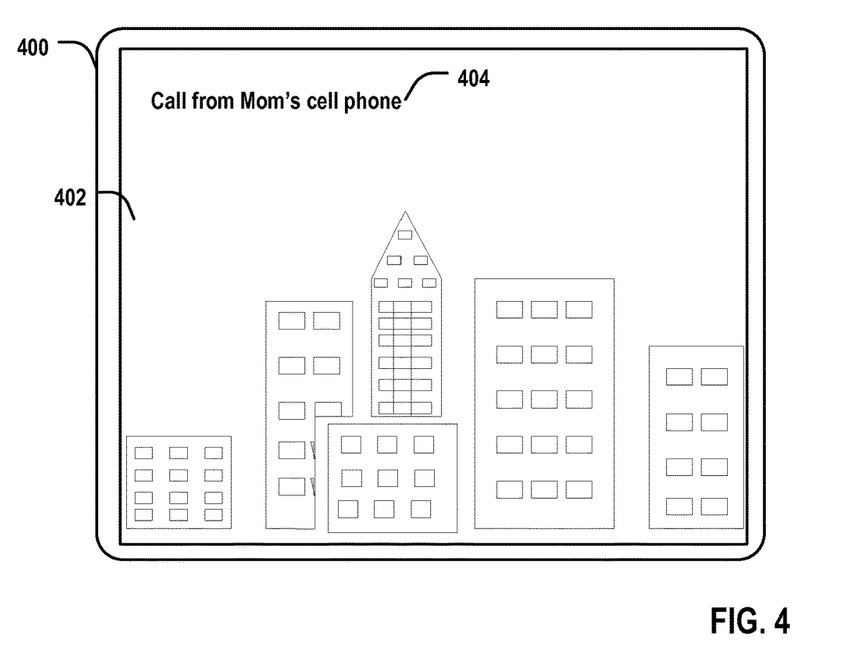
FIG. 4 is a diagram of a first particular embodiment of a user interface to present caller identification information.

FIG. 4 depicts a first particular embodiment of a user interface to present caller identification information, generally designated 400. The display 400 includes video content 402. For example, the video content 402 may include live video content received from a content provider. In another example, the video content 402 may include recorded video content recorded by a video processing device. In another example, the video content 402 may include game content from a game console.

In a particular embodiment, the display 400 includes data related to an incoming communication, such as caller identification information 404. The caller identification information 404 may indicate an identification of a calling party, such as a telephone number or name associated with a communication device from which the incoming communication was received. The caller identification information 404 may also indicated to which communication device the incoming communication was directed. For example, the caller identification information 404 may be presented in accordance with a display profile associated with the communication device to which the incoming communication is directed. In an illustrative embodiment, the caller identification information 404 may be displayed in a color pattern associated with the communication device; at a location on the display screen associated with a particular communication device, such as the top of the screen; or may include other characteristics or visual cues that identify the communication device that is receiving the incoming communication. In a particular embodiment, where the video content 402 includes recorded video content, the caller identification information 404 may indicate that the incoming communication is presently being received rather than that an incoming communication was received as the video content was recorded. That is, the video processing device may not record caller identification information received with video content that is being recorded when the caller identification information is received.

Figure 5:
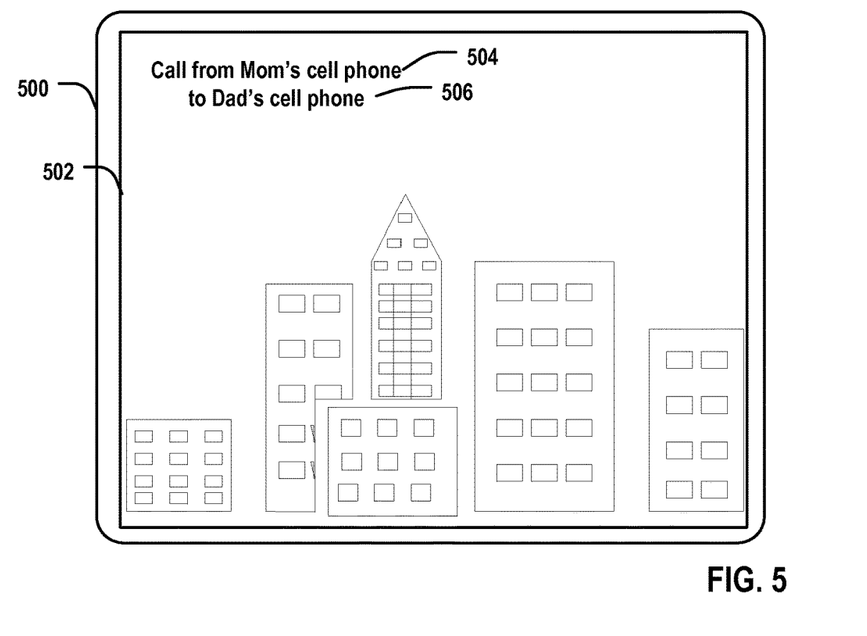
FIG. 5 is a diagram of a second particular embodiment of a user interface to present caller identification information.

FIG. 5 depicts a second particular embodiment of a user interface to present caller identification information, generally designated 500. The display 500 includes video content 502, such as live video content, recorded video content or game content. The display 500 includes caller identification information 504. The caller identification information 504 may include information to identify a calling party, such as name associated with the calling party, a communication device associated with the calling party, a graphic associated with the calling party, any other information associated with the calling party, or any combination thereof. The display 500 also includes information 506 identifying a called communication device. That is, the information 506 may identify the communication device to which the incoming communication is directed.

FIG. 6 depicts a third particular embodiment of a user interface to present caller identification information, generally designated 600. The display 600 includes video content 602. The display 600 also includes caller identification information 604. The display 600 further includes a graphic 606 associated with a called device. For example, the graphic 606 includes a symbol indicating that an incoming communication associated with the caller identification information 604 is directed to a mobile communication device, such as a cellular telephone.

FIG. 7 depicts a fourth particular embodiment of a user interface to present caller identification information, generally designated 700. The display 700 includes video content 702. The display 700 also includes caller identification information 704. The display 700 also includes a graphic 706 associated with a called device. For example, the graphic 706 includes a symbol indicating that an incoming communication associated with the caller identification information 704 is directed to a landline telephone.

Figure 8:
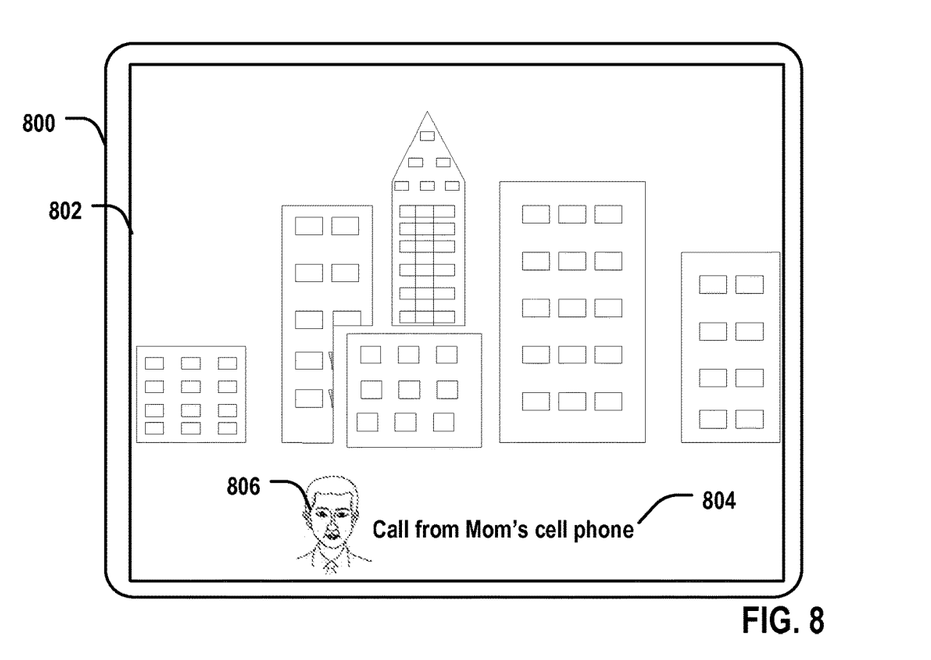
FIG. 8 is a diagram of a fifth particular embodiment of a user interface to present caller identification information.

FIG. 8 depicts a fifth particular embodiment of a user interface to present caller identification information, generally designated 800. The display 800 includes video content 802. The display 800 also includes caller identification information 804. The display also includes a graphic 806 associated with a communication device to which an incoming communication associated with the caller identification information is directed. For example, the graphic 806 may include a photograph of a party associated with the communication device. In a particular embodiment, the graphic 806 may be stored in association with a display profile associated with the communication device. The display profile may also indicate that the caller identification information is to be displayed at a bottom portion of the screen, as shown in FIG. 8.

Figure 9:
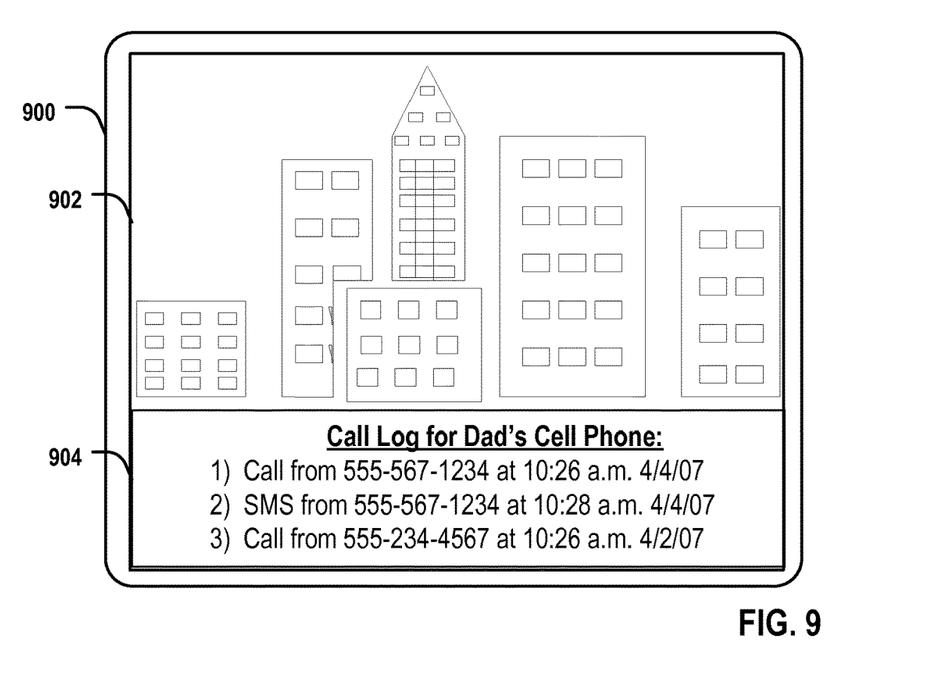
FIG. 9 is a diagram of a sixth particular embodiment of a user interface to present caller identification information.

FIG. 9 depicts a sixth particular embodiment of a user interface to present caller identification information, generally designated 900. The display 900 includes video content 902. The display 900 also includes, a call log 904 including a record of incoming communications. For example, the call log 904 may be associated with a particular communication device, such "Dad's cell phone". In a particular embodiment, the call log 904 may include information such as caller identification information, a time at which the call was received, other information related to an incoming communication, or any combination thereof. The call log 904 may also include information identifying a type of the incoming communication. For example, the call log may indicate that the incoming communication was a voice communication, such as a "call", or an indication that an incoming communication was a data communication, such as a "SMS" communication.

In conjunction with the configuration of structure described herein, the systems and methods disclosed provide caller identification information. In a particular illustrative embodiment, a wireless communication module of a video processing device may receive caller identification module from a first communication device. Logic associated with the video processing device may select a first display profile associated with the first communication device from among a plurality of display profiles. An output of the video processing device may generate a display in accordance with the first display profile. The display may include data related to the caller identification information.

Figure 10:
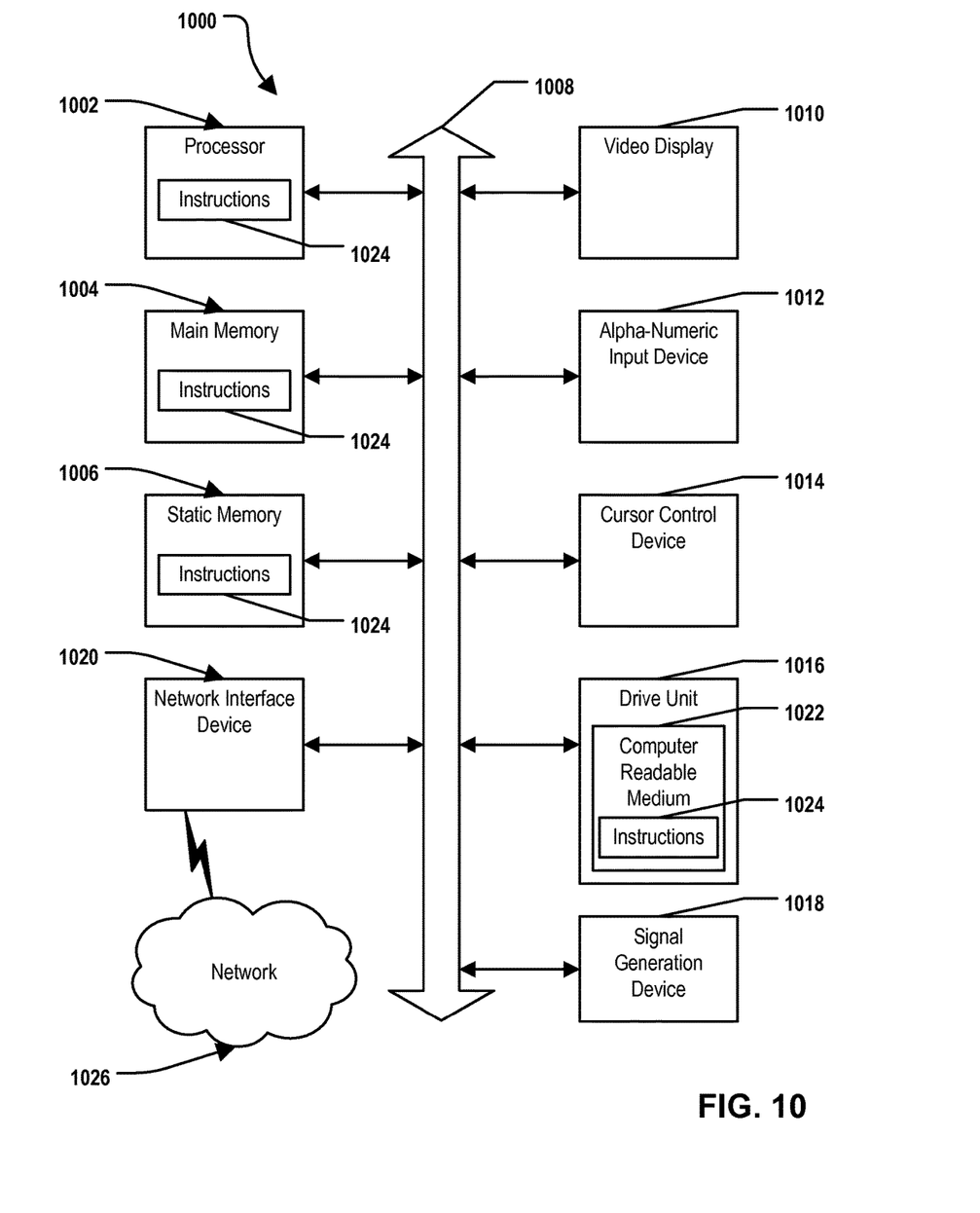
FIG. 10 is a block diagram of an illustrative embodiment of a computer system.

Referring to FIG. 10, an illustrative embodiment of a general computer system is shown and is designated 1000. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices. For example, the computer system 1000 may include or be included within any one or more of the content provider devices, network devices, set-top box devices, video processing devices, communication devices, audio devices, or other devices depicted in and described with reference to FIGS. 1-3.

In a networked deployment, the computer system may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. Moreover, the computer system 1000 can include a main memory 1004 and a static memory 1006, that can communicate with each other via a bus 1008. As shown, the computer system 1000 may further include a video display unit 1010, such as a liquid crystal display (LCD), an organic light emitting diode (OLED), a flat panel display, a solid state display, or a cathode ray tube (CRT). Additionally, the computer system 1000 may include an input device 1012, such as a keyboard, and a cursor control device 1014, such as a mouse. The computer system 1000 can also include a disk drive unit 1016, a signal generation device 1018, such as a speaker or remote control, and a network interface device 1020.

In a particular embodiment, as depicted in FIG. 10, the disk drive unit 1016 may include a computer-readable medium 1022 in which one or more sets of instructions 1024, e.g. software, can be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1024 or receives and executes instructions 1024 responsive to a propagated signal, so that a device connected to a network 1026 can communicate voice, video or data over the network 1026. Further, the instructions 1024 may be transmitted or received over the network 1026 via the network interface device 1020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    receiving, by an electronic device, call data associated with an incoming communication directed to a first destination communication device, wherein the first destination communication device is distinct from the electronic device, and wherein the call data includes a first identifier corresponding to the first destination communication device and call information corresponding to a calling party;
    retrieving, by the electronic device based on the first identifier, a first display profile of a plurality of display profiles, the first display profile including display settings for a display of particular call information to a display device coupled to the electronic device; and
    generating the display for the incoming communication based on the display settings from the first display profile and based on the call information, wherein the display identifies the first destination communication device and a source communication device that sent the incoming communication, the source communication device distinct from the first destination communication device and the electronic device.

2. The method of claim 1, further comprising displaying the display to the display device.

3. The method of claim 1, wherein the first display profile indicates a location of a display area on the display device for the display.

4. The method of claim 1, wherein the first display profile specifies visual information associated with the first destination communication device, and wherein the visual information is to be displayed to the display device responsive to incoming communications directed to the first destination communication device.

5. The method of claim 4, wherein the visual information includes text that identifies the incoming communication as being directed to the first destination communication device.

6. The method of claim 4, wherein the visual information includes a photograph of a person associated with the first destination communication device.

7. The method of claim 4, wherein the visual information includes a symbol indicating that the first destination communication device is a mobile communication device.

8. The method of claim 4, wherein the visual information includes a symbol indicating that the first destination communication device is a telephone.

9. The method of claim 8, wherein the symbol includes an image of a landline telephone.

10. The method of claim 4, wherein the first display profile is configured by a user associated with the first destination communication device.

11. The method of claim 1, further comprising overlaying the display on a portion of media content sent from the electronic device to the display device.

12. A method comprising:
    receiving, by an electronic device, first call data associated with a first call to a first destination communication device that is distinct from the electronic device, wherein the first call data includes a first identifier corresponding to the first destination communication device and call information corresponding to a calling party;
    retrieving, by the electronic device based on the first identifier, a first display profile of a plurality of display profiles, the first display profile including display settings for a display of particular call information to a display device coupled to the electronic device; and
    sending, by the electronic device to the display device, the display, the display based on the display settings from the first display profile and based on the call information, wherein the display identifies the first destination communication device and a source communication device that sent the first call, the source communication device distinct from the first destination communication device and the electronic device.

13. The method of claim 12, further comprising:
    receiving, at the electronic device, second call data associated with a second call to a second destination communication device, the second destination communication device distinct from the first destination communication device and distinct from the electronic device, wherein the second call data includes a second identifier corresponding to the second destination communication device and second call information corresponding to a second calling party;
    retrieving, based on the second identifier, a second display profile of the plurality of display profiles, the second display profile including second display settings for a second display of particular call information to the display device; and
    sending the second display to the display device, the second display based on the display settings from the second display profile and based on the second call information.

14. The method of claim 13, wherein the display indicates that the first call is directed to a first person, and wherein the second display indicates that the second call is directed to a second person.

15. The method of claim 14, wherein the display includes a first image or a first icon associated with the first person, and wherein the second display includes a second image or a second icon associated with the second person.

16. The method of claim 13, wherein the display includes a first phone number associated with the first destination communication device, and wherein the second display includes a second phone number associated with the second destination communication device.

17. The method of claim 13, wherein the display includes first text that identifies the first call as being directed to a first person associated with the first destination communication device, and wherein the second display includes second text that identifies the second call as being directed to a second person associated with the second destination communication device.

18. A processor-readable memory device including processor-readable instructions executable by a processor to perform operations comprising:

receiving, by an electronic device, first call data associated with an incoming call to a first destination communication device, wherein the first destination communication device is distinct from the electronic device, and wherein the first call data includes a first identifier corresponding to the first destination communication device and call information corresponding to a calling party;

retrieving a first display profile of a plurality of display profiles based on the first identifier, the first display profile including display settings for a display of particular call information to a display device coupled to the electronic device; and sending the display to the display device, the display based on the display settings from the first display profile and based on the call information, wherein the display identifies the first destination communication device and a source communication device that sent the incoming call, the source communication device distinct from the first destination communication device and the electronic device.

19. The processor-readable memory device of claim 18, wherein the display includes an icon associated with a first person associated with the first destination communication device.

20. The processor-readable memory device of claim 19, wherein the icon identifies the first destination communication device as a mobile communication device.

* * * * *